United States Patent [19]

Presley

[11] Patent Number: 4,471,283

[45] Date of Patent: Sep. 11, 1984

[54] AVERAGE CURRENT REGULATION FOR STEPPER MOTORS

[75] Inventor: Donald R. Presley, Lexington, Ky.

[73] Assignee: International Business Machines Corporation, Armonk, N.Y.

[21] Appl. No.: 438,439

[22] Filed: Nov. 2, 1982

[51] Int. Cl.³ .......................................... H02K 29/04
[52] U.S. Cl. .................... 318/696; 318/685; 318/341
[58] Field of Search ...................... 318/685, 696, 341

[56] References Cited

U.S. PATENT DOCUMENTS

| | | | |
|---|---|---|---|
| 4,074,179 | 2/1978 | Kuo et al. | 318/696 |
| 4,306,181 | 12/1981 | Welburn | 318/696 |
| 4,418,304 | 11/1983 | Iwai | 318/311 |

Primary Examiner—J. V. Truhe
Assistant Examiner—Saul M. Bergmann
Attorney, Agent, or Firm—William J. Dick

[57] ABSTRACT

A circuit (30) for regulating the current level in a pulse width modulated stepper motor drive (10), the circuit (30) comprising a clock (26) for providing a signal output at a preset and predetermined frequency and duty cycle. A power supply (Vs) supplies current for energizing the windings (A-D) of a stepping motor, the circuit (30) chopping the current and controlling the chop duty cycle to maintain a predetermined current in stepping motor windings (A-D), the chop frequency being directly related to said clock frequency. The circuit (30) senses the current flowing through the windings (A-D) of the motor, and compares, in a differential amplifier (32), the sensed current to a predetermined current level (Vref). A sample/hold amplifier (35) samples at predetermined times dependent upon the duty cycle of said clock (26), the output of the differential amplifier (32), the output of said sample/hold amplifier (35) being a signal whose level is related to the difference between the actual sensed current the predetermined current level. A portion of the circuit 30 (comparator 45, latch 50) having an output signal turned on by a specific clock transition and turned off at a time related to the level of said output signal of said sample/hold circuit, pulse width modulates the chop of the motor current.

20 Claims, 3 Drawing Figures

AVERAGE CURRENT REGULATION FOR STEPPER MOTORS

TECHNICAL FIELD OF THE INVENTION

The present invention relates to stepper motors and more particularly to a stepper motor drive circuit in which the average current level is regulated to insure that the stepper motor will develop the average required torque.

THE PRIOR ART

In stepper motor drive circuits, the control switches, normally transistors, are switched on and off during chopping to control the duty cycle to the level required to maintain the desired average motor winding current. When the transistor switches are switched off, the winding current flows through catch diodes back to the power supply and not through the sense resistor. For this reason, the average voltage developed across the sense resistor is a poor representation of the average motor winding current.

Conventionally, circuit designers attempt to circumvent this problem by employing a pulse-width-modulated (PWM) control circuit that controls the peak value of the motor current. The peak-to-peak motor current ripple (during PWM) is a function of the electrical parameters of the motor (inductance and resistance), the motor back-emf and the power supply voltage. Controlling the peak value allows the average value to change because of motor operation and power supply voltage changes. For example, when regulating on the peak current, if peak-to-peak ripple is small the average current level may exceed the desired current level. Alternatively, if the current ripple is large, the average current may be below the desired current level. Inasmuch as motor torque is directly related to average current level, the motor torque is difficult to control utilizing peak current regulation.

In view of the above, the present invention has the advantage of regulating on the desired average current as opposed to the current peak thereby allowing greater control over the motor torque. As will become more evident hereinafter, the type of circuit employed utilizes a sample/hold amplifier which may be adjusted to provide current and chop frequency stability for any motor-drive combination. Moreover, by using a DC reference voltage, the motor current is easily adjustable. This allows for less critically toleranced parts and therefore a saving in circuit cost.

The foregoing advantages may be accomplished by empolying a DC referenced differential amplifier feedback from the sense resistor in series with the stepper motor windings, and applying the output to a sample/hold amplifier which is clock sequenced. When the clock is low, (about 25% of the clock cycle) the sense resistor voltage is sampled and then held when the clock signal goes high. When the clock signal goes high the motor current is near its average value. A clocked (same clock) sawtooth generator has its output applied to one input of a comparator, the other input being from the output of the sample/hold amplifier. The output from the comparator is applied to a latch whose output is applied to state-of-the-art phase switching control logic and predrive for the motor windings. In this manner the sample/hold tends to regulate the average value of the current rather than the peak value. In the preferred embodiment, the duty cycle of the clock is preferably 50% of the duty cycle of the current flowing through the motor windings. (i.e., If the duty cycle of the current PWM pulse is 50%, then a clock of 25% low, assuming triggering on the clock low pulse, meets this criteria.)

The closest prior art appears to be Texas Instrument Bulletin No. DL-s 12495, April 1977, "Linear Integrated Circuits," pg. 113, entitled "Regulating Pulse Width Modulators." This article teaches to use the differential output in conjunction with a sawtooth to control the duty cycle of a voltage regulator. There is no mention of a sample/hold amplifier for allowing regulation on the average current as opposed to peak current.

Other advantages of the circuit of the present invention may be had with reference to the following specification and claims taken in conjunction with the accompanying drawings.

DRAWING DESCRIPTION

GENERAL

Figure 1:
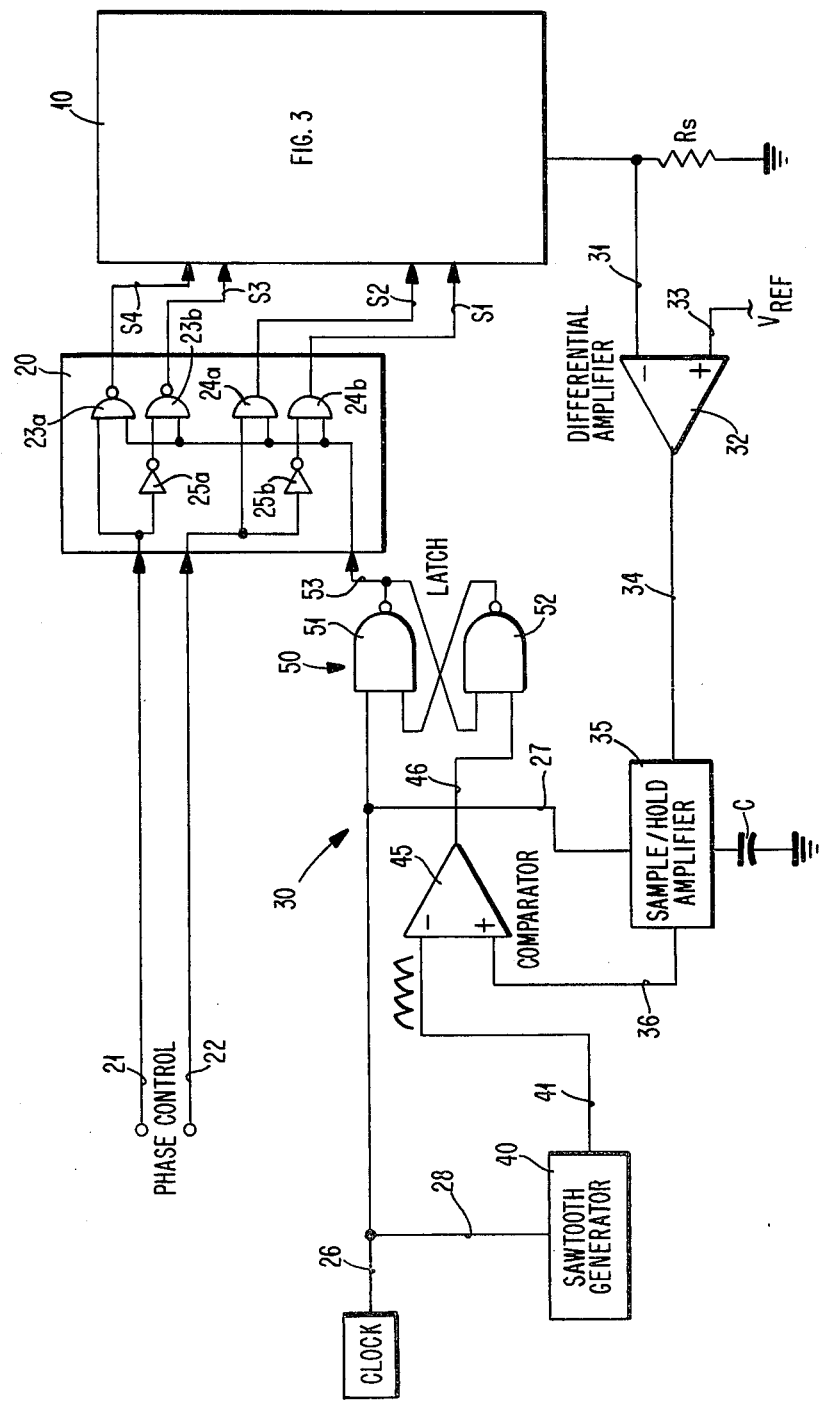
FIG. 1 is a schematic drawing of a PWM control circuit for a stepping motor, the circuit being constructed in accordance with the present invention.

Turning now to the drawings, and more specifically FIG. 1, pulse-width-modulation control circuitry 30 insures, in accordance with the invention, that the average current level applied to the stepping motor and drive circuit 10 is the reference for current regulation so that the stepper motor will develop the average required torque.

Figure 3:
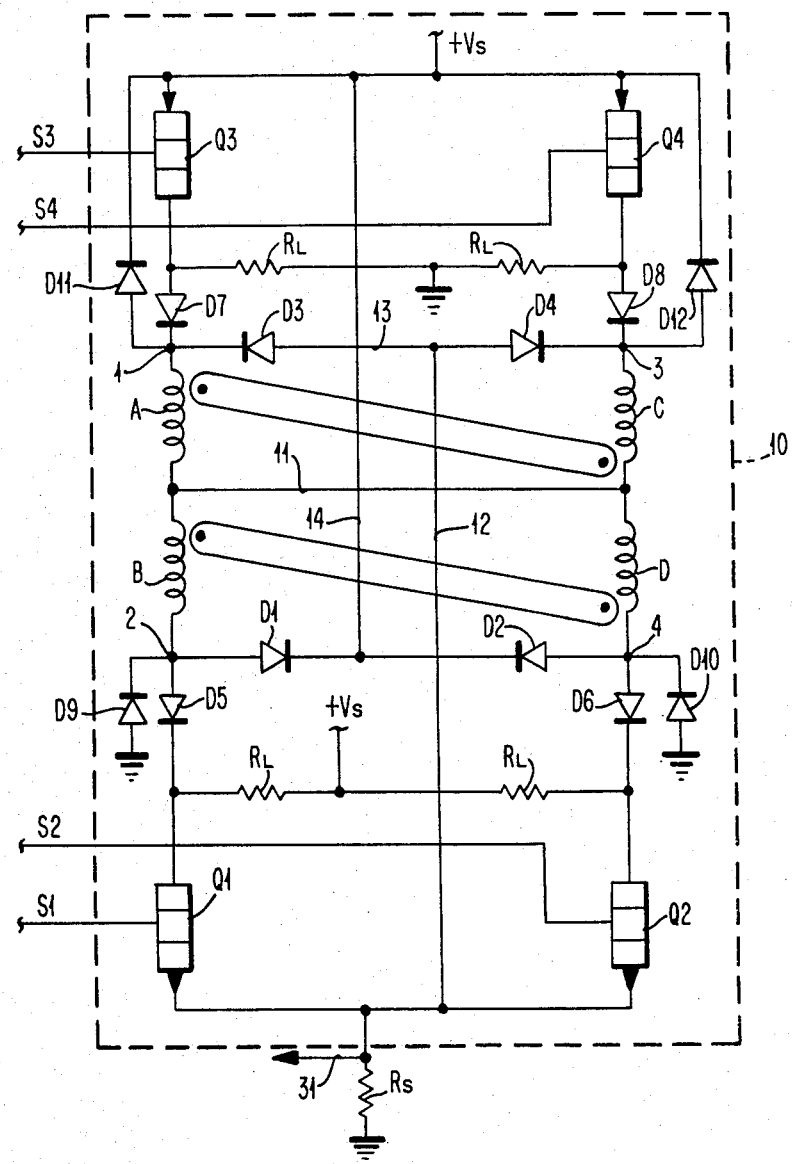
FIG. 3 is a schematic diagram of a sample drive circuit for a stepping motor, which drive circuit is to be controlled by the control circuit illustrated in FIG. 1.

Turning briefly now to FIG. 3, the motor and drive circuit 10 is schematically illustrated therein. As shown, and by way of example only, the motor is a four phase, two-pole bifilar wound permanent magnet stepping motor. In this connection, the motor coils or phases are designated A, B, C, D. Motor phases or coils A and C are bifilar wound as are phases B and D, each of the phases being connected together at a common point or connection 11. The phases of the motor are connected respectively to transistors Q1-Q4 for permitting current to flow from the source of power Vs to ground through sense resistor Rs. The operation of the drive circuit will be more completely described hereinafter in the section denoted "Drive Circuit." Suffice at this juncture that the stepping sequence is such that the coils or phases through which current passes is as follows: AB, AD, CD, CV, AB .... Phase and switching control logic and predrive for turning on and off the specific transistors Q1-Q4 to obtain the stepping sequence set forth above is conventional logic 20 which receives its phase control through lines 21, 22 from any convenient source such as a microprocessor (not shown).

The transistors Q1-Q4 in the driver and motor circuit 10 are pulse-width modulated, the waveform being chopped or modulated to maintain the current level. The control circuitry 30, illustrated in FIG. 1, serves to pulse width modulate the transistor drivers Q1-Q4. In general, the control circuitry 30 comprises a differential amplifier 32, a sample hold amplifier 35, a sawtooth generator 40, a comparator 45, and latch 50, which provides pulse-width-modulation (PWM) control on the average value of current rather than the peak value as most PWM circuits. The current level can be set by ajusting a DC reference voltage (Vref) which is easy to generate accurately. The slew rate of the sample-hold amplifier may be adjusted as by the value of capacitor C to provide compensation for current and chop frequency stabilization.

DRIVE CIRCUIT

To better understand the operation of the control circuit 30 of the present invention, it is advisable that the example drive cirucuitry 10, best illustrated more completely in FIG. 3, be fully described. At the outset, it should be recognized that the control circuit 30 of the present invention may be employed with the drive circuitry for any stepping motor, although a four phase, permanent magnet stepping motor is schematically illustrated along with its drive circuitry in FIG. 3.

As described above, the power supply Vs is coupled to the phases A-D via transistor switches Q1-Q4 respectively, the current flowing through the sense resistor Rs to ground. Recalling the stepping sequence in one direction is, AB, AD, CD, CB etc., when it is desirable to energize phases AB, transistors Q1 and Q3 are switched on by appropriate pulse-width-modulated signals on lines S1 and S3 respectively. With transistors Q1 and Q3 on, current flows through transistor Q3, diode D7, phase A, phase B, diode D5, transistor Q1, and resistor Rs to ground.

When the current reaches some predetermined level, the waveform is chopped causing transistors Q1 and Q3 to be turned on and off. When the transistors are turned off, the inductors (phases or coils A and B) tend to keep the current flowing in the same direction and a voltage reversal occurs at the coil or phases. For example, at node 1, (top of coil or phase A), the voltage which formally was close to the supply voltage Vs, is now negative, while at the bottom of phase B at node 2, the voltage is now positive. The current flow caused by the energy stored in phases A and B will then go from ground, through resistor Rs, through lead 12 into line 13, catch diode D3, phases A and B (note the same direction) diode D1 and then through connection or line 14 to the supply voltage Vs.

As set forth heretofor, phases A and C as well as phases B and D are bifilar wound, the dots representing the same physical location at the top of the winding comprising the coils A and C as well as B and D respectively. As shown in the drawing, opposite ends of the coils are connected together as through connection line 11. When phases A and B are cut off, as by chopping, the voltage at node 3 (top end of phase C) will be positive due to the mutual coupling between phases A and C, and the bottom end of phase D at node 4 will be negative. This allows current flow from ground, through diode D10, phases D and C, through diode D12 to the power supply Vs. Roughly half of the current flows through the latter mentioned path back to the power supply Vs and through coils or phases C and D, the other half flowing back to the power supply through coils or phases A and B. In this manner, current stored by the inductors (coils or phases) A and B is returned to the power supply.

In order to energize phases A and D, transistors Q3 and Q2 are turned on, transistors Q1 and Q4 being turned off. Current flow, therefore, is from the power supply Vs, through phase A, through connecting line 11, phase D, transistor Q2 and resistor Rs to ground. When the current reaches a predetermined level, chopping once again commences. When chopping commences, transistors Q3 and Q2 are modulated on and off. With Q3 and Q2 off during modulation, the voltage at node 1 switches to negative, the top of phase C at node 3 going positive due to mutual induction, and the bottom of phase D goes positive causing current flow to continue through phase A and phase D in the same direction, through diode D2 through connection 14 back to the power supply Vs. Of course the current flows upwardly through resistor Rs, line connection 12, through diode D3 to complete the circuit. At the same time, because the lower junction of phase D at node 4 is positive, the lower junction of phase B at node 2 is, by mutual induction, caused to go negative. This causes current to flow from ground through diode D9, through phase B, line connection 11, through phase C, diode D12 and back to the power supply Vs. Once again, approximately half of the current flows through the latter path and half through the former path when the transistors Q3 and Q2 are turned off.

The current flow through phases C and D with transistors Q4 and Q2 on, and the current paths, when chopping occurs (i.e., Q4 and Q2 turned on and off) is the mirror image of the current flow paths indicated heretofore and described above when phases A and B are on and modulated or chopped. Similarly, the current paths for phases C and B on is the mirror image of that which occurs when phases A and D are on and may be traced accordingly.

Diodes D5-D12 in conjunction with resistors RL form protective transient and switching spike suppressor networks for the transistors Q1-Q4.

CONTROL CIRCUITRY FOR PULSE-WIDTH-MODULATION

As set forth heretofore, the circuit 30 controls chopping and pulse-width-modulation of the on and off signals for transistors Q1-Q4 so as to control the duty cycle at the level required to maintain the average motor winding current desired. As has been described, when the active transistors are switched off during modulation, approximately one-half the winding current flows through selected catch diodes (D1-D4) back to the power supply and not through the current sense resistor Rs. The remainder of the current flows through the sense resistor Rs in the direction opposite from that when the transistors are turned on. This causes the average voltage across the sense resistor to be dependent on duty cycle as well as the average motor winding current. For this reason, the average voltage developed across the sense resistor is a poor representation of the average motor winding current.

In the circuit 30, and referring now to FIG. 1, the voltage across the sense resistor Rs is sampled at a first logic level of the clock, in the present instance while the signal is low, and held at a second logic level, i.e., as illustrated when the clock signal is high. In this connection it should be noted that the active clock signal on line 26 is negative or low. The clock signal may be derived from any convenient clock source such as the clock associated with a microprocessor or a computer clock circuit. In accordance with the invention, by sampling the voltage across the sense resistor when the clock signal is at a first level and holding when the clock signal is at a second level, the circuit tends to regulate the average value of the current, rather than the peak value.

Figure 2:
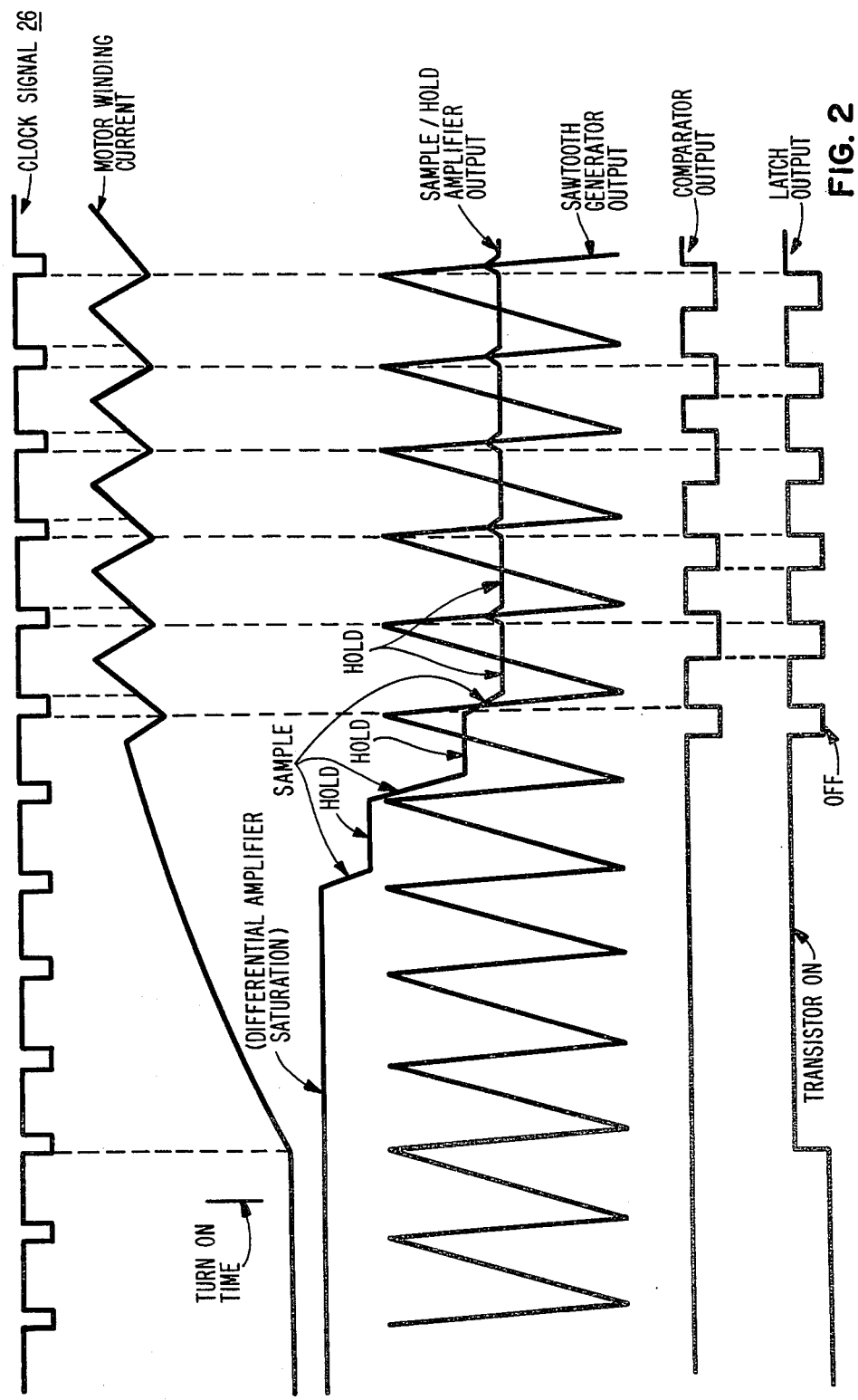
FIG. 2 is a wave-form diagram of the circuit of FIG. 1 in operation.

To this end, and referring now to FIGS. 1 and 2, the differential amplifier 32 receives an input along line 31 from the high side of sense resistor Rs, and a second input from a DC reference source voltage Vref, from line 33. The output signal 34 from the differential amplifier 32 is applied to an input of the sample/hold amplifier 35. The clock signal 26 is applied as through line 27 to the sample/hold amplifier 35.

The following discussion assumes that the motor and drive circuit 10 therefor is off, and that a signal is applied to phase control lines 21 and 22 such that the motor phases A and B are selected to be energized. Referring to FIG. 2, at the time of selection by an appropriate lines 21 and 22 (depicted as turn-on-time), and assuming that the turn-on-time occurs when the clock signal 26 is high, the next occurrence of the clock signal going low turns on transistors Q1 and Q3 causing current to flow through phases A and B. Since the current through the windings is initially low, the voltage developed across the sense resistor Rs is much lower than the reference voltage Vref, applied to the positive input (line 33) of the differential amplifier 32. This means that initially the output of the differential amplifier 32 is at a maximum causing the output on line 34 to be high indicating saturation of the differential amplifier.

The sample/hold amplifier 35 samples the output of the differential amplifier 32 when the clock is low, in the illustrated instance about 25% of the clock cycle, and holds when the clock signal 26 goes high. A periodic waveform generator, in the present instance the saw tooth generator 40, is also clock sequenced as through line 28 from the clock line 26 and applies its output to the comparator 45 along line 41. The shape of the sawtooth signal along line 41 is illustrated in FIG. 2 along with its relationship to the clock signal 26. The second input to the comparator 45 is from the output 36 of the sample/hold amplifier 35, the comparator 45 output signal on line 46 being applied to cross coupled nand gates 51 and 52 forming the latch 50. The latch 50 is set by the leading edge of the clock signal applied on line 26 and reset by the comparator output on line 46 going low.

As shown in the first portion of the sample/hold waveform diagram (labelled "differential amplifier saturation"), the output of the sample/hold amplifier 35 remains above the sawtooth signal as long as the voltage developed across the sense resistor Rs is lower than Vref. As shown in the lower portion of FIG. 2, this means that the latch output on line 53 remains in the high or "on" state allowing current to flow through the windings A and B until the current in the windings reaches a level selected by the level of Vref, and the value of the sense resistor Rs. This operation is assured by designing the saw tooth generator 40 so that the upper limit of the sawtooth is below the upper limit of the sample/hold amplifier 35 output, and the gain of the sample/hold amplifier 35 is high enough so that it remains saturated until the current is sufficiently close to the desired value.

When the motor winding current has risen to a point where the voltage developed across the sense resistor Rs approaches the value of the reference voltage Vref., the circuit operates in the following manner. When the clock signal goes low, transistors Q1 and Q3 are latched on through logic circuit 20. Current in the motor windings A and B begins to rise along with the voltage across the sense resistor Rs. The difference between the voltages across the sense resistor and Vref is amplified by the differential amplifier 32 and the sample/hold amplifier 35. When the clock signal goes high, the output voltage level of the sample/hold amplifier 35 is held. When the output level of the sample/hold amplifier 35 matches that of the rising level of the saw tooth, the comparator 45 output on line 46 causes transistors Q1 and Q3 to be latched off by turning off the latch 50. As shown by the dotted lines in FIG. 2, the comparator 45 output signal going low causes the latch 50 output signal to go low while the occurrence of the clock "on" signal causes the latch to be turned on. In other words, the transistors Q1 and Q3 remain off until the clock signal again goes low. In this manner, the duty cycle of Q1 and Q3 is adjusted so that the current selected by the value of the sense resistor Rs and the reference voltage Vref, is maintained. Thus the current is controlled by regulation of chopping at the predetermined current level as shown by the motor winding current trace illustrated in FIG. 2.

An examination of the motor winding current trace of FIG. 2 shows that the latch output of the latch 50 occurs at clock turn on and current starts increasing in the motor winding until latch turn off. Inasmuch as the sawtooth generator output, sample/hold amplifier 35 output and latch 50 turn on are all clock dependent, the turn off point of the clock determines the average point of chopping of the motor current. Thus at the time the clock signal goes high, the motor current is very near its average value. By sampling the voltage across the sense resistor when the clock signal is low and holding when the clock signal goes high, the circuit tends to regulate the average value of the current, rather than the peak value.

For critical applications, the clock pulse width may be adjusted so that the "held" value is at the average value, but for most applications the error is insufficient to cause significant loss of torque. For example if the current ripple is 10% of the average current, and the "hold" time is in error by 10%, then the average current level is in error by 10% times 10%=1%. In accordance with the teachings of the present invention, the duty-cycle of the clock should be one half the duty cycle of the motor.

LOGIC 20

The logic 20 which interfaces the phase control lines 21 and 22 to the example drive and motor circuit 10 may take any convenient form, one such form being illustrated in FIG. 1. In the illustrated instance, the logic includes a pair of two input NAND gates 23a, 23b, a pair of two input AND gates 24a and 24b, one each of the NAND and AND gates being connected directly and respectively to a respective one of the phase control lines 21 and 22. As shown, the other inputs to one of the NAND and one of the AND gates is through phase inverters 25a and 25b. The second input to all of the gates emanates from the latch 50 output on line 53. The AND gates 24a, 24b have their outputs coupled respectively to signal lines S2, S1 while the NAND gates 23a, 23b are coupled respectively to the signal lines S4 and S3. As illustrated, the signal lines are coupled to the bases of the transistors Q1–Q4 (FIG. 3).

For the convenience of the reader, set forth below is a phase table indicating the signals present on the phase control lines 21 and 22 to turn on and off, at appropriate times, the transistors Q1–Q4. In the table, the latch out signal is from line 53 of the latch 50, and the one and zero indications are merely high or low signal levels. To prevent confusion, inasmuch as transistors Q3 and Q4 are PNP transistors and Q1 and Q2 are NPN transistors, (as shown diagrammatically in FIG. 3), the indication as to whether the transistor is on or off with the phase control lines being in the state indicated is set forth in the table. Moreover, as shown in the last line of the table, when the latch out signal on line 53 is low, the state of the signal on the phase control lines 21 and 22 is irrelevant.

| Phase | Latch Out | 21 | 22 | Q1 | Q2 | Q3 | Q4 |
|---|---|---|---|---|---|---|---|
| (AB) | 1 | ∅ | ∅ | ON | OFF | ON | OFF |
| (AD) | 1 | ∅ | 1 | OFF | ON | ON | OFF |
| (CD) | 1 | 1 | 1 | OFF | ON | OFF | ON |
| (CB) | 1 | 1 | / | ON | OFF | OFF | ON |
|  | ∅ | * | * | OFF | OFF | OFF | OFF |

*Does not make any difference whether the signal on phase lines 21 and 22 are on or off.

SUMMARY

Thus a combination of the differential amplifier 32 and the sample/hold amplifier 35 generates a signal whose level is related to the difference between the actual average current and a reference (DC Vref) indicative of the desired average current. Moreover, the duty cycle of the clock controls the sample point of the sample/hold amplifier 35. The duty cycle is predetermined so that the sample point (hold) is at the average current rather than the peak current. This kind of difference signal is employed to pulse-width-modulate the chop signal.

It should be recognized that the operation of the control circuit 30 is identical for each phase pair combination, even though the example given was for phases A and B and associated transistors Q1 and Q3. Moreover, the sample/hold amplifier slew rate may be adjusted to provide current and chop frequency stability for a particular motor/drive combination, regardless of type. What's more, the use of a DC reference voltage makes the reference and therefore the motor current easily adjustable, for example by a digital to analog convertor.

Although the invention has been described with a certain degree of particularity, it is understood that the present disclosure has been made only by way of example and numerous changes in the details of construction and the combination and arrangement of parts and the mode of operation may be made without departing from the scope of the invention as hereinafter claimed.

What is claimed is:

1. A circuit for modulating the current in a stepper motor, said circuit comprising:
   means for sensing the magnitude of current passing through a motor and comparing the magnitude of said current to a predetermined current level, said means outputting a first signal indicative of the difference between said current passing through said motor and said predetermined current level;
   a clock having a clock signal out, said clock signal having a predetermined duty cycle;
   means for sampling said first signal on a first logic level of said clock signal and holding said sample upon a second logic level of said clock signal;
   means for comparing said sample to a clock sequenced periodic waveform to effect a second signal output;
   and means responsive to said second signal and said clock signal for modulating the current through said motor when said current reaches said predetermined current level.

2. A circuit for modulating the current in a stepping motor in accordance with claim 1 wherein said clock duty cycle is related to the duty cycle of the current waveform for said motor.

3. A circuit for modulating the current in a stepping motor in accordance with claim 1 including a periodic waveform generator having a clock signal input.

4. A circuit for modulating the current in a stepping motor in accordance with claim 3 wherein said periodic waveform generator is a sawtooth generator.

5. A circuit for modulating the current in a stepping motor in accordance with claim 2 wherein said clock duty cycle is 50% of the duty cycle of the current waveform for said motor.

6. A circuit for modulating the current in a stepping motor in accordance with claim 5 wherein said duty cycle of said motor current waveform is 50%.

7. A circuit for modulating the current in a stepping motor in accordance with claim 1 wherein said means for sampling comprises a sample/hold amplifier for receiving said first signal.

8. A circuit for modulating the current in a stepping motor in accordance with claim 1 wherein said means for sensing the magnitude of current passing through the motor and comparing the magnitude comprises a differential amplifier.

9. A circuit for modulating the current in a stepping motor in accordance with claim 8 wherein said means for sampling comprises a sample/hold amplifier.

10. A circuit for modulating the current in a stepping motor in accordance with claim 9 wherein said means for comparing comprises a comparator.

11. A circuit for modulating the current in a stepping motor in accordance with claim 10 wherein said means responsive to said second signal output comprises a latch, said latch being set by said clock signal and reset by said comparator.

12. A circuit for regulating the current level in a pulse width modulated stepper motor drive, said circuit comprising:
   a clock for providing a signal output at a predetermined frequency and duty cycle;
   means for supplying current for energizing the windings of a stepping motor;
   and means for chopping the current and controlling the chop duty cycle to maintain a predetermined current in said stepping motor windings, said chop frequency being directly related to said clock frequency;
   said means for chopping and controlling comprising;
   sensing means for sensing the current flowing through a winding of said motor and for comparing the sensed current to a predetermined current level;
   a sample/hold circuit for sampling, at predetermined times dependent upon the duty cycle of said clock, the result of said comparison, the output of said sample/hold circuit being a signal whose level is related to the difference between the actual sensed current and said predetermined current level;

and a pulse-width-modulating circuit having an output signal turned on by a specific clock transition and turned off at a time related to the level of said output signal of said sample/hold circuit.

13. A circuit for regulating the current level in a pulse-width-modulated stepping motor drive in accordance with claim 12 wherein said clock output has a duty cycle of approximately 50% of the duty cycle of the motor current duty cycle when current in said winding is modulated.

14. A circuit for regulating the current level in a pulse-width-modulated stepping motor drive in accordance with claim 13 wherein said duty cycle of said clock is approximately 25% low and 75% high.

15. A circuit for regulating the current level in a pulse-width-modulated stepping motor drive in accordance with claim 12 wherein said pulse-width-modulated circuit comprises a comparator and a latch.

16. A circuit for regulating the current level in a pulse-width-modulated stepping motor drive in accordance with claim 13 wherein said pulse-width-modulated circuit comprises a comparator and latch.

17. A circuit for regulating the current level in a pulse-width-modulated stepping motor drive in accordance with claim 15 including a periodic waveform generator clocked as to frequency by said clock, and providing an input to said comparator.

18. A circuit for regulating the current level in a pulse-width-modulated stepping motor drive in accordance with claim 17 wherein said periodic waveform generator is a sawtooth generator, and wherein said sample/hold amplifier samples on a first change of state of said clock output and holds on an adjacent sequential change of state.

19. A circuit for regulating the current level in a pulse-width-modulated stepping motor drive in accordance with any of claim 12, wherein said predetermined current level for said sensing means is a DC voltage.

20. In combination, a circuit for regulating the current level in a pulse-width-modulated stepper motor and drive therefor, said combination comprising:
a clock for providing a signal output at a preset and predetermined frequency and duty cycle;
means for supplying current for energizing the windings of a stepping motor;
and means for chopping the current and controlling the chop duty cycle to maintain an average current in said stepping motor windings, said chop frequency being directly related to said clock frequency;
said means for chopping and controlling comprising:
sensing means for sensing the current flowing through a winding of said motor, and a difference amplifier for comparing the sensed current to a predetermined current level;
a sample/hold circuit for sampling, at predetermined times, the output of said difference amplifier, said predetermined time of sampling being dependent upon the state of said clock the output of said sample/hold circuit being a signal whose level is related to the difference between the actual sensed current and said predetermined current level;
and a pulse width modulating means having an output signal turned on by a specific clock transition and turned off at a time related to the level of said output signal of said sample/hold circuit;
logic means, and a stepping motor drive circuit connected thereto; and means coupling said pulse width modulating means to said logic means for chopping current flow through said motor windings in accordance with said output signal from said pulse width modulating means.

* * * * *